(12) United States Patent
Poikonen et al.

(10) Patent No.: US 9,699,694 B2
(45) Date of Patent: Jul. 4, 2017

(54) MOBILITY MANAGEMENT ENTITY (MME) TRIGGERED DETACH AND RE-ATTACH TO A SPECIFIC TARGET MME

(71) Applicant: NOKIA SOLUTIONS AND NETWORKS OY, Espoo (FI)

(72) Inventors: Henri Mikael Poikonen, Helsinki (FI); Joanna Pauliina Jokinen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/784,831

(22) PCT Filed: Apr. 16, 2013

(86) PCT No.: PCT/EP2013/057860
§ 371 (c)(1),
(2) Date: Oct. 15, 2015

(87) PCT Pub. No.: WO2014/169950
PCT Pub. Date: Oct. 23, 2014

(65) Prior Publication Data
US 2016/0066219 A1 Mar. 3, 2016

(51) Int. Cl.
*H04W 36/00* (2009.01)
*H04W 8/12* (2009.01)
*H04W 76/06* (2009.01)

(52) U.S. Cl.
CPC ......... *H04W 36/0022* (2013.01); *H04W 8/12* (2013.01); *H04W 36/0016* (2013.01); *H04W 76/06* (2013.01)

(58) Field of Classification Search
CPC ............. H04W 36/0022; H04W 76/06; H04W 36/0016; H04W 8/12
See application file for complete search history.

(56) References Cited

U.S. PATENT DOCUMENTS

| 2013/0210466 A1* | 8/2013 | Arvidsson | H04W 4/025 455/458 |
| 2014/0211728 A1* | 7/2014 | Zembutsu | H04M 3/42 370/329 |

FOREIGN PATENT DOCUMENTS

| EP | 2 416 606 A1 | 2/2012 | |
| SE | EP 2416606 A1 * | 2/2012 | ............. H04W 8/12 |

OTHER PUBLICATIONS

3GPP TS 23.401 V12.0.0 (Mar. 2013); "3rd Generation Partnership Project; Technical Specification Group Services and System Aspects; General Packet Radio Service (GPRS) enhancements for Evolved Universal Terrestrial Radio Access Network (E-UTRAN) access (Release 12)"; 290 pages; 3rd Generation Partnership Project (3GPP); Mobile Competence Centre; 650, Route des Lucioles; F-06921 Sophia-Antipolis Cedex; France.

(Continued)

*Primary Examiner* — Chuong A Ngo
(74) *Attorney, Agent, or Firm* — Squire Patton Boggs (US) LLP (57) ABSTRACT

Systems, methods, apparatuses, and a computer program products for Mobility Management Entity (MME) triggered detach and re-attach to a specific target MME are provided. One method includes receiving or obtaining a trigger to move a UE attached to a source MME to another target MME. The receiving of the trigger may cause the initiating of a GUTI reallocation command towards the UE in which the MME code (MMEC) specifies the target MME and the M-TMSI is set to a reserved value. The method may further include receiving a GUTI reallocation complete message from the UE, sending a detach request to the UE with a detach type of "re-attach required," and receiving a detach accept message from the UE. The new attach request initiated by the UE is then directed towards the target MME. The target MME recognizes the reserved value, requests UE (Continued)

permanent identity with Identity Request message, UE responds with Identity Response specifying the permanent identity, and the registration with Attach towards the target MME continues.

16 Claims, 6 Drawing Sheets

(56) References Cited

OTHER PUBLICATIONS

International Search Report and Written Opinion dated Apr. 7, 2014 corresponding to International Patent Application No. PCT/EP2013/057860.

* cited by examiner

MOBILITY MANAGEMENT ENTITY (MME) TRIGGERED DETACH AND RE-ATTACH TO A SPECIFIC TARGET MME

BACKGROUND

Field

Embodiments of the invention generally relate to wireless communications networks, such as the Universal Mobile Telecommunications System (UMTS) Terrestrial Radio Access Network (UTRAN) Long Term Evolution (LTE) and Evolved UTRAN (E-UTRAN).

Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE improves spectral efficiency in communication networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs. In addition, LTE is an all internet protocol (IP) based network, supporting both IPv4 and IPv6.

The Evolved 3GPP Packet Switched Domain, which is also known as the Evolved Packet System (EPS), provides IP connectivity using the E-UTRAN.

SUMMARY

One embodiment is directed to a method including receiving or obtaining a trigger to move a UE attached to a source MME to another target MME. The receiving of the trigger may cause the initiating of a GUTI reallocation procedure for the UE in which the MME code (MMEC) specifies the target MME and the M-TMSI is set to a reserved value. The method may further include receiving a GUTI reallocation complete message from the UE. The method may also include sending a detach request to the UE with a detach type of "re-attach required," and receiving a detach accept message from the UE.

Another embodiment is directed to an apparatus. The apparatus includes at least one processor and at least one memory comprising computer program code. The at least one memory and the computer program code are configured, with the at least one processor, to cause the apparatus at least to receive or obtain a trigger to move a user equipment attached to the apparatus to a target mobility management entity. The trigger causes the apparatus to initiate a globally unique temporary ID (GUTI) reallocation procedure for the user equipment, wherein the GUTI reallocation comprises a mobility management entity code specifying the target mobility management entity and a mobility management entity temporary mobile subscriber identity set to a reserved value.

Another embodiment is directed to a computer program, embodied on a computer readable medium, wherein the computer program is configured to control a processor to perform a process. The process includes receiving or obtaining a trigger to move a UE attached to a source MME to another target MME. The receiving of the trigger may cause the initiating of a GUTI reallocation procedure for the UE in which the MME code (MMEC) specifies the target MME and the M-TMSI is set to a reserved value. The process may further include receiving a GUTI reallocation complete message from the UE. The process may also include sending a detach request to the UE with a detach type of "re-attach required," and receiving a detach accept message from the UE.

Another embodiment is directed to a method including receiving, by a target mobility management entity, an attach request message from a user equipment. The attach request message is based on a globally unique temporary ID (GUTI) reallocation comprising a mobility management entity code specifying the target mobility management entity and a mobility management entity temporary mobile subscriber identity set to a reserved value. The method may further include recognizing the reserved mobility management entity temporary mobile subscriber identity value from the GUTI, sending an identity request to the user equipment to request an international mobile subscriber identity of the user equipment, receiving an identity response from the user equipment including the international mobile subscriber identity of the user equipment, and continuing the registration of the user equipment.

Another embodiment is directed to an apparatus. The apparatus includes at least one processor and at least one memory comprising computer program code. The at least one memory and the computer program code are configured, with the at least one processor, to cause the apparatus at least to receive an attach request message from a user equipment. The attach request message is based on a globally unique temporary ID (GUTI) reallocation comprising a mobility management entity code specifying the apparatus and a mobility management entity temporary mobile subscriber identity set to a reserved value. The at least one memory and the computer program code are further configured, with the at least one processor, to cause the apparatus at least to recognize the reserved mobility management entity temporary mobile subscriber identity value from the GUTI, send an identity request to the user equipment to request an international mobile subscriber identity of the user equipment, receive an identity response from the user equipment including the international mobile subscriber identity of the user equipment, and continuing the registration of the user equipment.

Another embodiment is directed to a computer program, embodied on a computer readable medium, wherein the computer program is configured to control a processor to perform a process. The process includes receiving an attach request message from a user equipment. The attach request message is based on a globally unique temporary ID (GUTI) reallocation comprising a mobility management entity code specifying the target mobility management entity and a mobility management entity temporary mobile subscriber identity set to a reserved value. The process may further include recognizing the reserved mobility management entity temporary mobile subscriber identity value from the GUTI, sending an identity request to the user equipment to request an international mobile subscriber identity of the user equipment, receiving an identity response from the user equipment including the international mobile subscriber identity of the user equipment, and continuing the registration of the user equipment.

Another embodiment is directed to a method including receiving, by a user equipment, a globally unique temporary ID (GUTI) reallocation command from a source mobility management entity. The GUTI reallocation command comprises a mobility management entity code specifying a target mobility management entity and a mobility management entity temporary mobile subscriber identity set to a reserved value. The method may further include receiving a detach request from the source mobility management entity, wherein the detach request comprises a detach type of "re-attach required", initiating a new attach procedure by sending an attach request message to the target mobility management entity specified in the mobility management entity code of the received GUTI reallocation command, and continuing the registration of the UE to the target mobility management entity.

Another embodiment is directed to an apparatus. The apparatus includes at least one processor and at least one memory comprising computer program code. The at least one memory and the computer program code configured, with the at least one processor, to cause the apparatus at least to receive a globally unique temporary ID (GUTI) reallocation command from a source mobility management entity. The GUTI reallocation command comprises a mobility management entity code specifying a target mobility management entity and a mobility management entity temporary mobile subscriber identity set to a reserved value. The at least one memory and the computer program code are further configured, with the at least one processor, to cause the apparatus at least to receive a detach request from the source mobility management entity, wherein the detach request comprises a detach type of "re-attach required", initiate a new attach procedure by sending an attach request message to the target mobility management entity specified in the mobility management entity code of the received GUTI reallocation command, and continuing the registration of the UE to the target mobility management entity.

Another embodiment is directed to a computer program, embodied on a computer readable medium, wherein the computer program is configured to control a processor to perform a process. The process includes receiving a globally unique temporary ID (GUTI) reallocation command from a source mobility management entity. The GUTI reallocation command comprises a mobility management entity code specifying a target mobility management entity and a mobility management entity temporary mobile subscriber identity set to a reserved value. The process may further include receiving a detach request from the source mobility management entity, wherein the detach request comprises a detach type of "re-attach required", initiating a new attach procedure by sending an attach request message to the target mobility management entity specified in the mobility management entity code of the received GUTI reallocation command, and continuing the registration of the UE to the target mobility management entity.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of a system, methods, apparatuses, and computer program products for Mobility Management Entity (MME) triggered detach and re-attach to a specific target MME, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Figure 1:
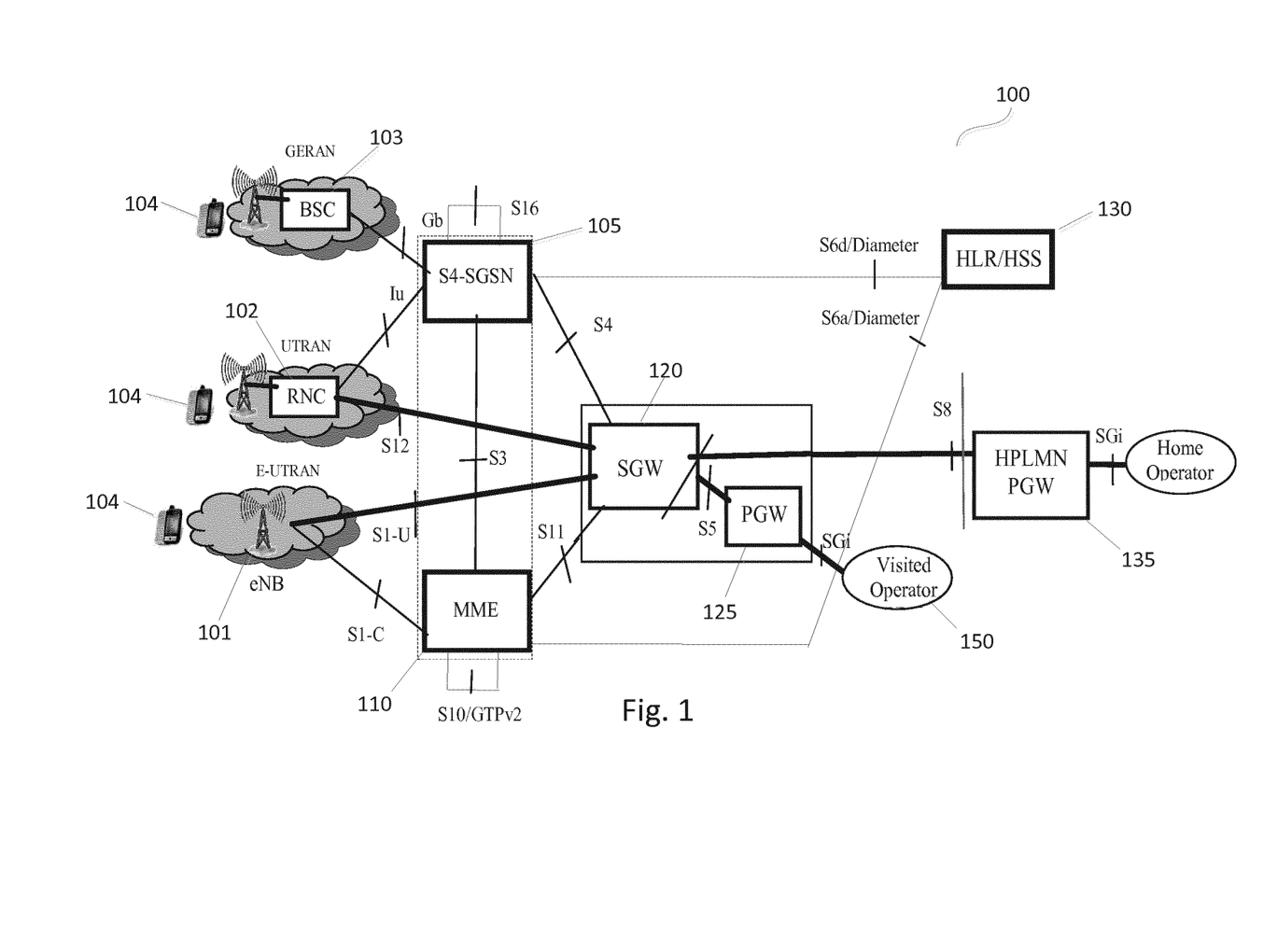
FIG. 1 illustrates a system according to one embodiment.

The evolved packet system (EPS) is the evolution of the general packet radio system (GPRS). EPS provides a new radio interface and new evolved packet core (EPC) network functions for broadband wireless data access. FIG. 1 illustrates an example of the EPS core network 100, according to an embodiment. As illustrated in FIG. 1, the EPS core network 100 may include the Mobility Management Entity (MME) 110, Packet Data Network Gateway (PGW) 125, and Serving Gateway (SGW) 120. MME 110 may be connected to SGW 120 via the S11 interface, and the SGW 120 in turn may be connected to PGW 125 via the S5 interface.

A common packet domain core network, such as EPS core network 100, can be used to provide core network functionality to the base station controller (BSC) 103 of the GSM/Edge radio access network (GERAN), the radio network controller (RNC) 102 of the UTRAN, and the eNodeB (eNB) 101 of the E-UTRAN.

MME 110 may be considered the main control node for the core network 100. Some features handled by MME 110 include: bearer activation/de-activation, idle mode UE tracking, choice of SGW for a UE 104, intra-LTE handover involving core network node location, interacting with the home location register (HLR)/home subscriber server (HSS) 130 to authenticate user on attachment, and providing temporary identities for UEs 104.

HLR/HSS 130 is a central database that contains user-related and subscription-related information. Functions of the HLR/HSS 130 may include mobility management, call and session establishment support, user authentication and access authorization.

SGW 120 is a data plane element within the core network 100. SGW 120 manages user plane mobility and acts as the main interface between the radio access network(s) and the core network. SGW 120 can also maintain the data path between the eNBs 101 and PGW 125. As a result, SGW 120 may form an interface for the data packet network at the E-UTRAN. SGW 120 may also be in communication with home public land mobile network (HPLMN) gateway 135. PGW 125 provides connectivity for the UE to external packet data networks (PDNs). A UE 104 may have connectivity with more than one PGW 125 for accessing multiple PDNs 150.

A serving GPRS support node (SGSN) 105 may be provided in the core network 100 to transfer information to and from the GERAN and UTRAN via an Iu interface, for example. SGSN 105 may communicate with SGW 120 via, for example, the S4 interface. SGSN 105 may store location information for a UE, such as current cell, and may also store user profiles, such as international mobile subscriber identity (IMSI).

3GPP has standardized MME load re-balancing, as described in 3GPP TS 23.401. However, this standardized solution has some associated problems. For example, the target MME cannot be assigned from the source MME initiating the load balancing tracking area update (TAU). In addition, new functionalities are likely needed in UE/eNB behavior.

Further, the 3GPP standardized MME load re-balancing solution does not support the case where a customer wants to specifically move certain UE(s) from the current MME to a specific target MME for troubleshooting or load re-balancing reasons, for example.

Accordingly, embodiments of the invention provide for MME triggered detach and re-attach to a specific target MME. For example, one embodiment provides a method for the source MME to move a UE to another specific target MME in the same MME pool.

In one embodiment, the source MME may receive or obtain an internal or external trigger (e.g., from operations and maintenance (O&M)) to trigger the detach and subsequent re-attach to the specific target MME. This embodiment first triggers a globally unique temporary ID (GUTI) reallocation procedure for a specific UE, where the MME code and group ID in the GUTI reallocation command specifies the target MME in the pool. The GUTI is allocated to the UE by the MME. The GUTI has two components: the Globally Unique MME ID (GUMMEI), and the MME temporary mobile subscriber identity (M-TMSI). The GUMMEI identifies the MME that has allocated the GUTI, and the M-TMSI identifies the UE within the MME that allocated the GUTI.

According to an embodiment, the M-TMSI in the GUTI may need to be a reserved value that can be configured inside the specific MME pool. This value has specific meaning for all MMEs in the pool and MMEs should not allocate the reserved M-TMSI for any actual UE during normal procedures.

Next, according to one embodiment, the source MME can initiate a detach procedure with detach type "re-attach required." In response, the UE may locally deactivate EPS bearers and respond with a detach accept message. The UE may then initiate a new attach procedure. Since the new GUTI points to the target MME, the new attach is directed to the target MME. The source MME may receive a cancel location request from the HSS when the UE has moved to the target MME.

In an embodiment, the target MME recognizes the reserved GUTI/M-TMSI value and requests the international mobile subscriber identity (IMSI) from the UE with an identity request procedure. Since the M-TMSI value is the reserved value, the target MME does not ask for UE data from any other MME/SGSN. After the target MME has received the IMSI, attach can continue normally and the UE is registered to the target MME.

Figure 2:
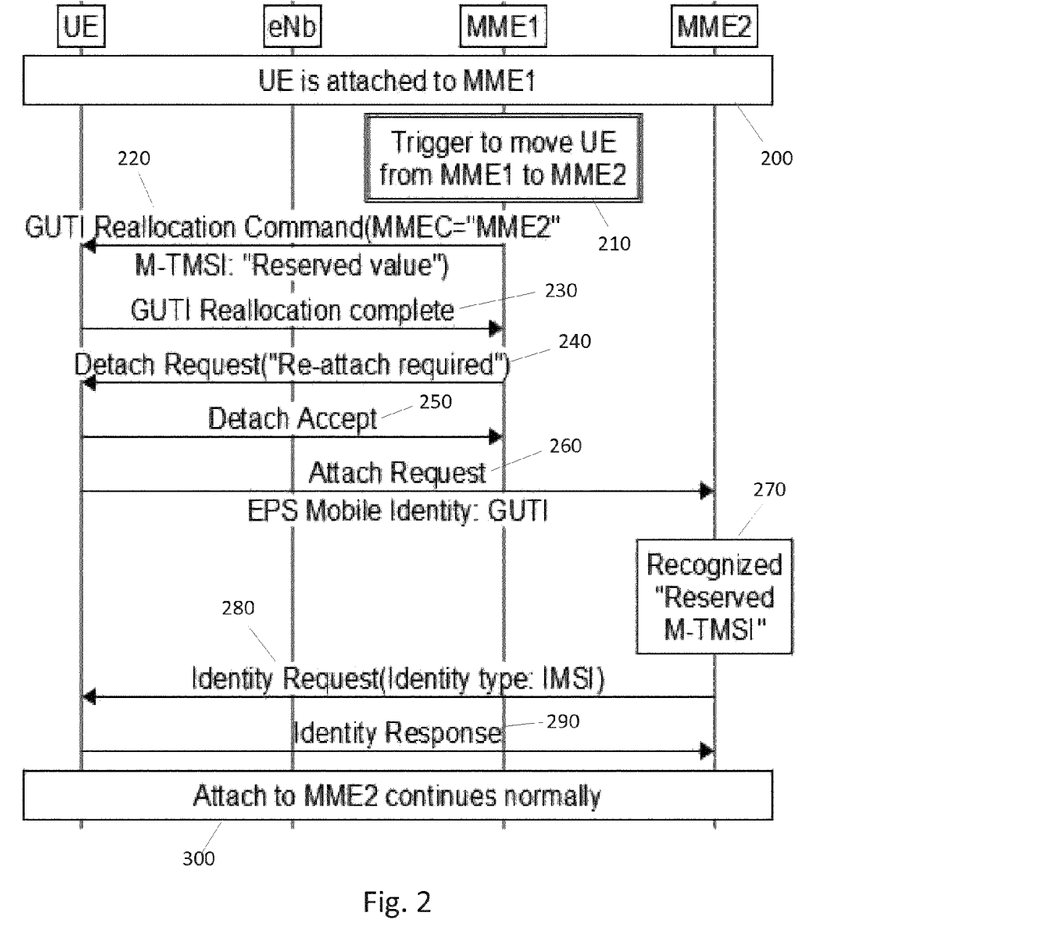
FIG. 2 illustrates a signaling diagram according to an embodiment.

FIG. 2 illustrates an example of a signaling diagram depicting an MME triggered detach and re-attach to a specific target MME, according to one embodiment. As illustrated in the example of FIG. 2, at 200, the UE is attached to MME1 (i.e., source MME). At 210, MME1 is triggered to move the UE from MME1 to MME2 (i.e., target MME). The trigger causes MME1 to initiate, at 220, a GUTI reallocation procedure for the UE by initiating GUTI reallocation command message towards the UE, where the MME code (MMEC) specifies MME2 and the M-TMSI is set to a reserved value. At 230, the UE sends a GUTI reallocation complete message to MME1. Next, at 240, MME1 sends a detach request to the UE with detach type of "re-attach required." In response to the detach request, at 250, the UE may send a detach accept message to MME1. Then, at 260, the UE initiates a new attach procedure by sending an attach request message to MME2 based on the MMEC received in the GUTI. At 270, MME2 recognizes the reserved M-TMSI value from the GUTI and, at 280, sends an identity request to the UE to request its IMSI. The UE may then send an identity response including its IMSI to MME2, at 290. After receiving the IMSI, at 300, the attach procedure to MME2 can proceed normally and the UE is registered to MME2.

Figure 3A:
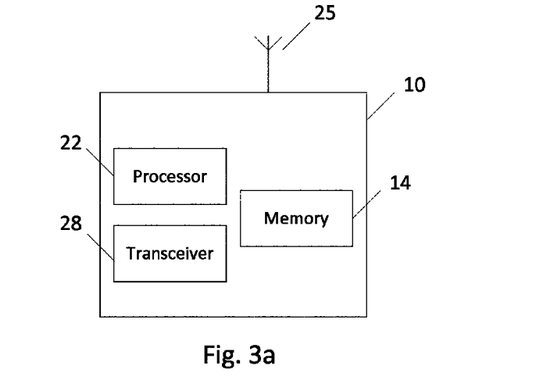
FIG. 3a illustrates an apparatus according to one embodiment.

FIG. 3a illustrates an example of an apparatus 10 according to an embodiment. In one embodiment, apparatus 10 may be a network entity, such as an MME, for example MME1 or MME2 in FIG. 2 above. It should be noted that one of ordinary skill in the art would understand that apparatus 10 may include components or features not shown in FIG. 3a. Only those components or features necessary for illustration of the invention are depicted in FIG. 3a.

As illustrated in FIG. 3a, apparatus 10 includes a processor 22 for processing information and executing instructions or operations. Processor 22 may be any type of general or specific purpose processor. While a single processor 22 is shown in FIG. 3a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a source MME (e.g., MME1 in FIG. 2). In this embodiment, apparatus 10 may be controlled by memory 14 and processor 22 to receive or obtain a trigger to move a UE attached to apparatus 10 to another target MME (e.g., MME2 in FIG. 2). In this embodiment, the receiving of the trigger causes apparatus 10 to initiate a GUTI reallocation procedure for the UE by sending GUTI reallocation command towards the UE, in which the MME code (MMEC) specifies the target MME and the M-TMSI is set to a reserved value. Apparatus 10 may then be controlled by memory 14 and processor 22 to receive a GUTI reallocation complete message from the UE. Apparatus 10 may be further controlled by memory 14 and processor 22 to send a detach request to the UE with a detach type of "re-attach required." In response to the detach request, apparatus 10 may be controlled by memory 14 and processor 22 to receive a detach accept message from the UE.

In another embodiment, apparatus 10 may be a target MME (i.e., MME2). In this embodiment, apparatus 10 may be controlled by memory 14 and processor 22 to receive an attach request message from a UE. The attach request message is based on a GUTI including a MMEC identifying the target MME and a M-TMSI including a reserved value. Apparatus 10 may be controlled by memory 14 and processor 22 to recognize the reserved M-TMSI value from the GUTI, and to send an identity request to the UE to request its IMSI. Apparatus 10 may then be controlled by memory 14 and processor 22 to receive an identity response from the UE including its IMSI. After receiving the IMSI, the UE registration is continued to apparatus 10.

Figure 3B:
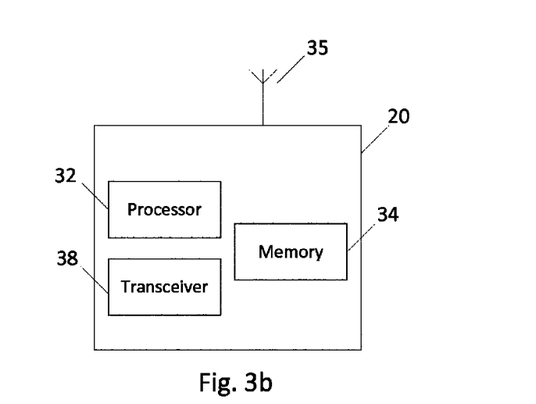
FIG. 3b illustrates an apparatus according to another embodiment.

FIG. 3b illustrates an example of an apparatus 20 according to another embodiment. In an embodiment, apparatus 20 may be a UE. It should be noted that one of ordinary skill in the art would understand that apparatus 20 may include components or features not shown in FIG. 3b. Only those components or features necessary for illustration of the invention are depicted in FIG. 3b.

As illustrated in FIG. 3b, apparatus 20 includes a processor 32 for processing information and executing instructions or operations. Processor 32 may be any type of general or specific purpose processor. While a single processor 32 is shown in FIG. 3b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a UE. In this embodiment, apparatus 20 may be controlled by memory 34 and processor 32 to receive a GUTI reallocation command, from a source MME, in which the MME code (MMEC) specifies a target MME and the M-TMSI is set to a reserved value. Apparatus 20 may then be controlled by memory 34 and processor 32 to send a GUTI reallocation complete message to the source MME. Apparatus 20 may be further controlled by memory 34 and processor 32 to receive a detach request, from the source MME, with a detach type of "re-attach required." In response to the detach request, apparatus 20 may be controlled by memory 34 and processor 32 to send a detach accept message to the source MME. Then, apparatus 20 may then be controlled by memory 34 and processor 32 to initiate a new attach procedure by sending an attach request message to the target MME specified in the MMEC of the received GUTI. Apparatus 20 may then be controlled by memory 34 and processor 32 to receive, from the target MME, an identity request for the IMSI of apparatus 20. Apparatus 20 may be further controlled by memory 34 and processor 32 to send an identity response including its IMSI to the target MME. Apparatus 20 may then be controlled by memory 34 and processor 32 to register to the target MME.

Figure 4A:
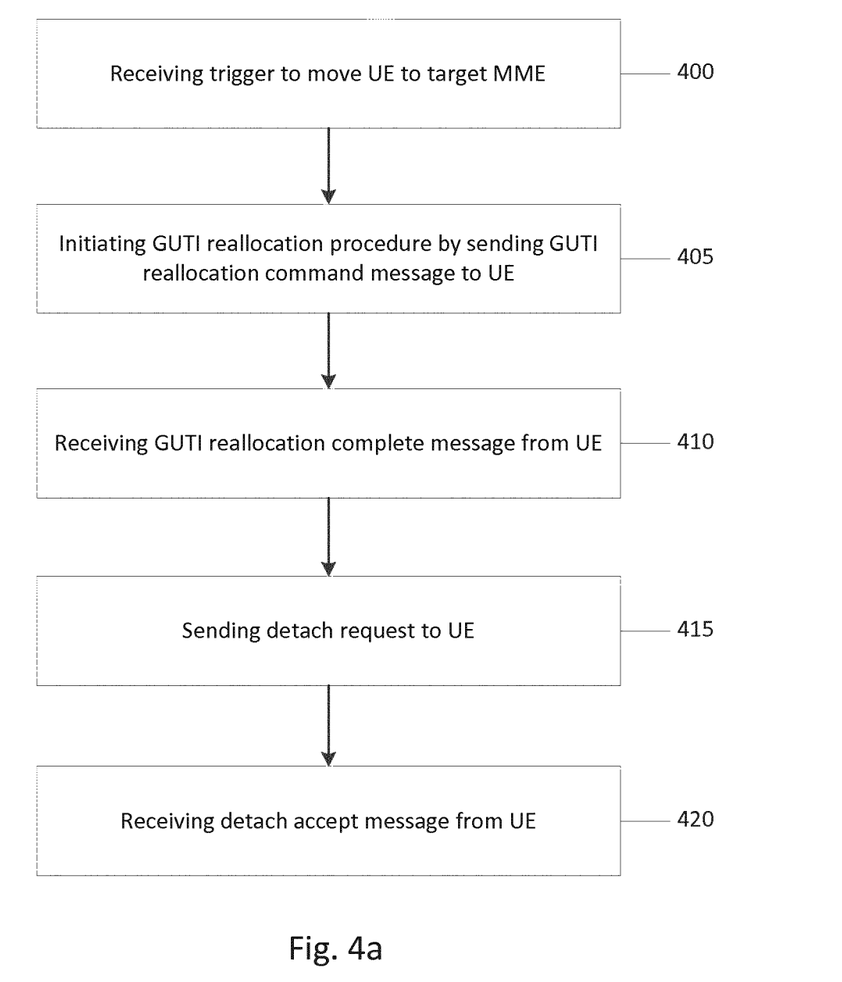
FIG. 4a illustrates a flow diagram of a method according to one embodiment.

FIG. 4a illustrates an example of a flow chart of a method for detach and re-attach to a specific target MME, according to one embodiment. In one example, the method of FIG. 4a may be performed by a source MME. The method may include, at 400, a source MME receiving or obtaining a trigger to move a UE attached to the source MME to another target MME. In this embodiment, the receiving of the trigger may cause, at 405, the initiating of a GUTI reallocation procedure by sending GUTI reallocation command for the UE in which the MME code (MMEC) specifies the target MME and the M-TMSI is set to a reserved value. The method may further include, at 410, receiving a GUTI reallocation complete message from the UE. The method may also include, at 415, sending a detach request to the UE with a detach type of "re-attach required," and, at 420, receiving a detach accept message from the UE.

Figure 4B:
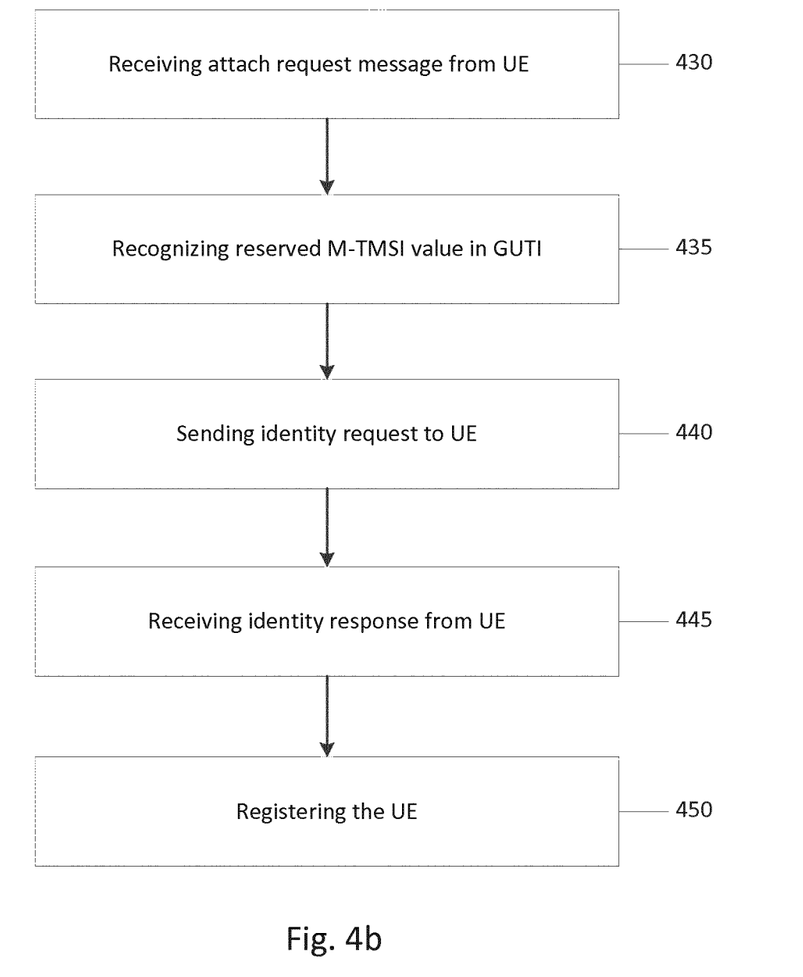
FIG. 4b illustrates a flow diagram of a method according to another embodiment.

FIG. 4b illustrates an example of a flow chart of a method for detach and re-attach to a specific target MME, according to another embodiment. In one example, the method of FIG. 4b may be performed by a target MME. The method may include, at 430, receiving an attach request message from a UE. The attach request message is based on a GUTI including a MMEC identifying the target MME and a M-TMSI including a reserved value. The method may further include, at 435, recognizing the reserved M-TMSI value from the GUTI, and, at 440, sending an identity request to the UE to request its IMSI. The method may then include, at 445, receiving an identity response from the UE including its IMSI. After receiving the IMSI, the method may include, at 450, continuing the registration of the UE.

Figure 4C:
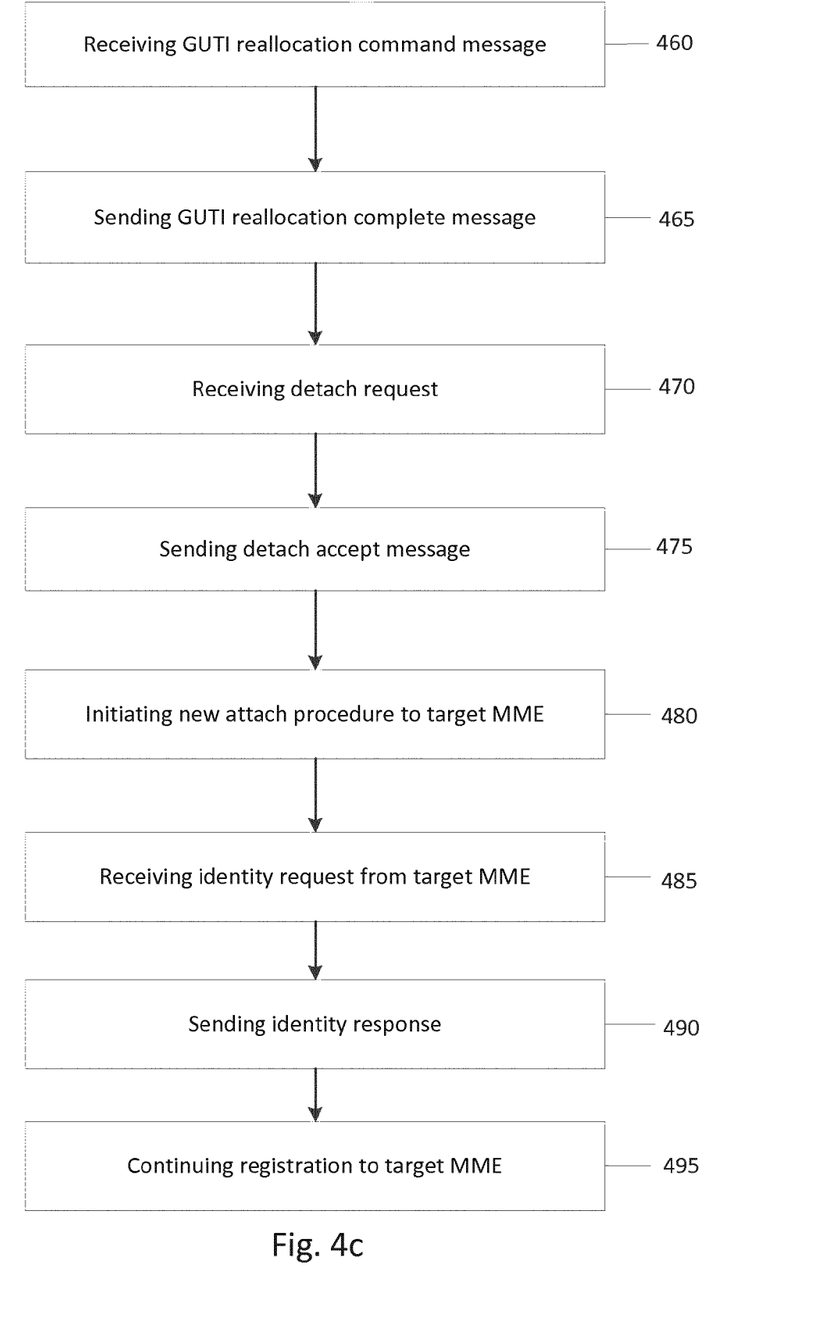
FIG. 4c illustrates a flow diagram of a method according to another embodiment.

FIG. 4c illustrates an example of a flow chart of a method for UE detach and re-attach to a specific target MME, according to another embodiment. In one example, the method of FIG. 4c may be performed by a UE. In this embodiment, the method may include, at 460, receiving a GUTI reallocation command, from a source MME, in which the MME code (MMEC) specifies a target MME and the M-TMSI is set to a reserved value. The method may further include, at 465, sending a GUTI reallocation complete message to the source MME. The method may then include, at 470, receiving a detach request, from the source MME, with a detach type of "re-attach required." In response to the detach request, the method may include, at 475, sending a detach accept message to the source MME. Then, the method may include, at 480, initiating a new attach procedure by sending an attach request message to the target MME specified in the MMEC of the received GUTI. The method may further include, at 485, receiving, from the target MME, an identity request for the IMSI of the UE. The method may then include, at 490, sending an identity response including the IMSI to the target MME. The method may also include, at 495, continuing of the registration to the target MME.

In some embodiments, the functionality of any of the methods described herein, such as those illustrated in FIGS. 4a, 4b, and 4c discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

In view of the above, embodiments make it possible to direct the UE to a specific new MME without requiring any standardization changes. With the current mechanism(s) it is not possible for source MME to select a specific target MME. Since no changes are needed to UE/eNB behaviour or standards, embodiments of the invention can be easily implemented in the network since only minimal changes in MMEs are needed.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
receiving or obtaining, by a source mobility management entity from an operations and maintenance source, a trigger to move a user equipment attached to the source mobility management entity to another target mobility management entity,
wherein the trigger causes the initiating of a globally unique temporary ID (GUTI) reallocation procedure for the user equipment by sending a GUTI reallocation command message, wherein the GUTI reallocation comprises a mobility management entity code specifying the target mobility management entity and a mobility management entity temporary mobile subscriber identity set to a reserved value, wherein the reserved value is configured inside a specific mobility management entity pool with specific meaning for all mobility management entities in the pool and is not allocated by any mobility management entity for user equipment during normal procedures.

2. The method according to claim 1, further comprising receiving a GUTI reallocation complete message from the user equipment.

3. The method according to claim 1, further comprising sending a detach request to the user equipment, wherein the detach request comprises a detach type of "re-attach required".

4. The method according to claim 1, further comprising receiving a detach accept message from the user equipment.

5. A non-transitory computer-readable medium encoded with instructions that, when executed in hardware, perform a method according to claim 1.

6. An apparatus, comprising:
at least one processor; and
at least one memory comprising computer program code, the at least one memory and the computer program code configured, with the at least one processor, to cause the apparatus at least to receive or obtain a trigger, from an operations and maintenance source, to move a user equipment attached to the apparatus to a target mobility management entity, wherein the trigger causes the apparatus to initiate a globally unique temporary ID (GUTI) reallocation command message for the user equipment, wherein the GUTI reallocation command comprises a mobility management entity code specifying the target mobility management entity and a mobility management entity temporary mobile subscriber identity set to a reserved value, wherein the reserved value is configured inside a specific mobility management entity pool with specific meaning for all mobility management entities in the pool and is not allocated by any mobility management entity for user equipment during normal procedures.

7. The apparatus according to claim 6, wherein the at least one memory and the computer program code are further configured, with the at least one processor, to cause the apparatus at least to receive a GUTI reallocation complete message from the user equipment.

8. The apparatus according to claim 6, wherein the at least one memory and the computer program code are further configured, with the at least one processor, to cause the apparatus at least to send a detach request to the user equipment, wherein the detach request comprises a detach type of "re-attach required".

9. The apparatus according to claim 6, wherein the at least one memory and the computer program code are further configured, with the at least one processor, to cause the apparatus at least to receive a detach accept message from the user equipment.

10. The apparatus according to claim 6, wherein the apparatus comprises a mobility management entity.

11. An apparatus, comprising:
at least one processor; and
at least one memory comprising computer program code, the at least one memory and the computer program code configured, with the at least one processor, to cause the apparatus at least to
receive a globally unique temporary ID (GUTI) reallocation command from a source mobility management entity, wherein the GUTI reallocation command comprises a mobility management entity code specifying a target mobility management entity and a mobility management entity temporary mobile subscriber identity set to a reserved value, wherein the reserved value is configured inside a specific mobility management entity pool with specific meaning for all mobility management entities in the pool and is not allocated by any mobility management entity for user equipment during normal procedures;
receive a detach request from the source mobility management entity, wherein the detach request comprises a detach type of "re-attach required";
initiate a new attach procedure by sending an attach request message to the target mobility management entity specified in the mobility management entity code of the received GUTI reallocation command; and
register to the target mobility management entity.

12. The apparatus according to claim 11, wherein the at least one memory and the computer program code are further configured, with the at least one processor, to cause the apparatus at least to send a GUTI reallocation complete message to the source mobility management entity.

13. The apparatus according to claim 11, wherein the at least one memory and the computer program code are further configured, with the at least one processor, to cause the apparatus at least to send a detach accept message to the source mobility management entity.

14. The apparatus according to claim 11, wherein the at least one memory and the computer program code are further configured, with the at least one processor, to cause the apparatus at least to receive, from the target mobility management entity, an identity request for an international mobile subscriber identity of the apparatus.

15. The apparatus according to claim 14, wherein the at least one memory and the computer program code are further configured, with the at least one processor, to cause the apparatus at least to send an identity response including the international mobile subscriber identity to the target mobility management entity.

16. The apparatus according to claim 11, wherein the apparatus comprises a user equipment.

* * * * *